United States Patent [19]

Babcock

[11] 4,357,166

[45] Nov. 2, 1982

[54] METHOD AND COMPOSITION FOR CONTROLLING VOLUME CHANGE IN FAST SETTING, FLUID IMPERMEABLE CEMENTITIOUS SYSTEMS

[75] Inventor: Warner K. Babcock, Stamford, Conn.

[73] Assignee: Construction Products Research, Inc., Old Greenwich, Conn.

[21] Appl. No.: 262,175

[22] Filed: May 11, 1981

[51] Int. Cl.$^3$ .............................................. C04B 7/02
[52] U.S. Cl. ........................................ 106/89; 106/90; 106/104
[58] Field of Search ............................ 106/104, 90, 89

[56] References Cited

U.S. PATENT DOCUMENTS

| | | | |
|---|---|---|---|
| 2,339,163 | 1/1944 | Friedlaender et al. | 106/104 |
| 3,147,129 | 1/1964 | Armstrong et al. | 106/109 |
| 3,775,143 | 11/1973 | Mikhailov et al. | 106/104 |
| 3,826,665 | 7/1974 | Hovasse et al. | 106/104 |
| 3,861,929 | 1/1975 | Deets et al. | 106/104 |
| 3,922,172 | 11/1975 | Crinkelmeyer et al. | 106/104 |
| 3,997,353 | 12/1976 | Chervenka et al. | 106/104 |
| 4,012,264 | 3/1977 | Murray et al. | 106/104 |
| 4,045,237 | 8/1977 | Gaines et al. | 106/104 |
| 4,157,263 | 6/1979 | Gaines et al. | 106/104 |
| 4,216,022 | 8/1980 | Wilson | 106/104 |

*Primary Examiner*—James Poer
*Attorney, Agent, or Firm*—Pennie & Edmonds

[57] ABSTRACT

A cementitious composition which, when mixed with water, is capable of setting rapidly into a hard mass of high compressive strength without substantial shrinkage during setting, and having reduced wet and dry volume changes in the hardened state comprises aluminous cement, gypsum, a drying shrinkage inhibitor and a wet expansion inhibitor. The wet expansion inhibitor is a lithium salt which may be added in an effective amount ranging between 0.01 to 0.5 percent, by weight, based on the aluminous cement and gypsum and preferably between 0.1 and 0.3 percent. It is preferred to employ between 60 and 90 percent, by weight, aluminous cement and between 10 and 40 percent, by weight, gypsum. The hardened drying shrinkage inhibitor, preferably Portland cement, is added in an amount ranging between 0.1 and 25 percent, by weight, based on the aluminous cement and gypsum, and preferably between 1 and 20 percent.

20 Claims, No Drawings

METHOD AND COMPOSITION FOR CONTROLLING VOLUME CHANGE IN FAST SETTING, FLUID IMPERMEABLE CEMENTITIOUS SYSTEMS

BACKGROUND OF THE INVENTION

1. Field of the Invention

This invention relates to a method and a composition for controlling volume change in fast setting, fluid impermeable cementitious systems. In particular, this invention relates to a method and a composition for inhibiting wet expansion, in the hardened state, of cementitious systems containing aluminous cement, gypsum, and Portland cement by adding thereto salts of lithium.

The term "cementitious systems," as used herein, is intended to mean compositions which generally possess the characteristic of hardening under water. Such systems include cementitious waterproofings, toppings, protective coatings, and the like as well as mixtures with aggregates and water such as concrete, mortar, grout and products made therefrom.

The term "aluminous cement," as used herein, is intended to include those cementitious materials normally understood in the art to contain, as the main cementitious constituent, monocalcium aluminate ($CaO.Al_2O_3$), such as high alumina cement and calcium aluminate cement. Examples of commercially available aluminous cements suitable for use in the invention are Lumnite by Lehigh Portland Cement Company and the high alumina cement Fondu or Secar by LoneStar LaFarge Aluminous Cement Company, Ltd.

The term "gypsum," as used herein, is intended to include gypsum such as normally understood in the art, including calcium sulfate ($CaSO_4$) and its various forms, calcium sulfate anhydrate, calcium sulfate hemihydrate, calcium sulfate dihydrate as well as calcined gypsum, pressure calcined gypsum and plaster of Paris. Examples of commercially available gypsums suitable for use in the invention are the pressure calcined gypsums sold under the tradename "K-5" by Georgia Pacific Corporation or the tradename "Hydrostone" by United States Gypsum Company.

The term "Portland cement," as used herein, is intended to include those cements normally understood in the art to be "Portland cements" such as described in the designation ASTM C 150, with the Type I and Type III being especially preferred for use in the invention although other forms of Portland cement are suitable. The Portland cement acts to reduce the drying shrinkage and will increase the wet expansion of the composition in the present invention. Thus, other cements acting as "drying shrinkage inhibitors," although not specifically referred to as Portland cement, are also suitable for use herein and the term should be understood as encompassing such other cements. Such other drying shrinkage inhibitors may include, for example, expansion promoters, such as expansive cements, which are compatible with the other constituents of the system.

The term "wet expansion," as used herein, is intended to mean expansion of a cementitious system in the hardened state, that is, after final set, in moist conditions as determined generally in accordance with the standard test method ASTM C 157-75 for "Length Change of Hardened Cement, Mortar and Concrete."

The terms "wet expansion inhibition" and "wet expansion counteraction" are used essentially interchangably herein to describe, as a minimum, a reduction in the wet expansion of the cementitous system in the hardened state and/or advantageously maintaining a volume equal to or greater than the system placement volume, and encompass similar terms such as "wet expansion elimination."

2. Description of the Prior Art

There have been various prior attempts at providing cementitious systems meeting the needs of the construction industry, particularly in the protection, waterproofing and repair of concrete structures. Such systems are desirably non-flammable, non-toxic and set within a relatively short period of time into a hard mass or coating with sufficient strength, abrasion resistance and corrosion resistance. They should also possess impermeability to fluids, particularly liquids. At the same time, such systems should not undergo excessive hardened volume changes under either wet or dry conditions. For commercial use, these types of cementitious systems must also possess good bonding characteristics to damp or dry surfaces, early as well as long term strength and practical field workability. They should be capable of withstanding freezing and thawing as well as the action of salts, solvents and other corrosive substances.

Although there are cementitious system compositions possessing one or more of the above desirable properties, prior attempts directed to achieving all of the foregoing in one composition have had only limited success. Many compositions of blended cement exhibit wet expansion. Other compositions which include the addition of certain accelerators to reduce setting time exhibit excessive drying shrinkage. Thus, prior attempts at providing cementitious compositions of commercial value in the construction industry have generally been specific or emphasized particular properties in disregard of, or, in some instances, in detriment to other desired attributes.

U.S. Pat. No. 3,861,929 discusses the inherent shrinkage characteristics of concretes made with conventional cements which result in cracks on hardening and drying. That patent discloses an expansive cement that, during and after setting and hardening, increases significantly in volume. The expansive cement disclosed comprises a mixture consisting essentially of Portland and calcium aluminate cements and a quantity of calcium sulfate which may be in the form of gypsum. U.S. Pat. No. 3,775,143 discloses a "stressing" cement which includes Portland cement and an expanding component consisting of calcium sulfate, calcium oxide and an aluminate containing material such as aluminous cement or high alkaline calcium hydroaluminate. The cement is said to exhibit water-proofness as well as benzine-and gasproofness.

U.S. Pat. No. 3,147,129 discusses some of the problems in the basic processes for producing sulfoaluminate cements including difficulty in control of properties. The patent then discloses a sulfoaluminate cement composition said to have uniform properties and which can be used as an expansive cement upon the inclusion of suitable additives such as zinc sulfate and sodium bisulfate. The patent states that certain constituents may be added as retarders which do not cause appreciable expansion and even tend to neutralize the expansive action of the additives such as zinc sulfate and sodium bisulfate. Such constituents may comprise sucrose, hydrated lime and silica mixtures.

Compositions containing high alumina cement and Portland cement for use as a quick setting mix have been known. For example, U.S. Pat. No. 4,012,264 states that it is known that very rapidly setting and hardening cement can be produced by mixing Portland cement and high alumina cement and/or by the use of various accelerators, and discloses a calcium-aluminate and Portland cement composition including retarders and/or accelerators. High alumina cement has also been added to plaster of Paris or anhydrite plasters in order to give stronger molds or castings. T. D. Robson, *High Alumina Cements and Concretes*, John Wiley & Sons, N.Y., 1962, pp. 126–7, discloses that lithium salts have been suggested as accelerators for high alumina cement. However, it has been found that compositions containing alumina cement, gypsum and lithium salts as an accelerator, alone, exhibit excessive hardened drying shrinkage. In addition, compositions containing aluminous cement and gypsum alone exhibit excessive hardened wet expansion.

U.S. Pat. No. 2,339,163 discloses a composition for a protective cement coating comprising calcium aluminate cement and an inorganic additive selected from the group consisting of calcium chloride, calcium sulfate, magnesium sulfate, ferric sulfate, aluminum sulfate and carbonates of alkali metals to accelerate the setting, as well as casein to limit the rate of evaporation of water so as to prevent too rapid drying and shrinkage. It is said that the material will produce a coating which will not crack after it has set and become hardened, apparently referring to the reduction of drying shrinkage.

U.S. Pat. Nos. 4,045,237 and 4,157,263 disclose a cementitous composition possessing a high degree of impermeability to liquid and vapor and reduced long term shrinkage, composed of a particulate mixture of Portland cement, a calcined gypsum and high alumina cement. Alternatively, the composition can be composed of a particulate mixture of a high alumina cement and pressure calined gypsum.

SUMMARY OF THE INVENTION

I have discovered a cementitious composition which, when mixed with water, is capable of setting rapidly into a hard mass of high compressive strength without substantial shrinkage during setting and which exhibits reduced wet and dry volume changes in the hardened state. It also possesses a high degree of impermeability to fluids, and abrasion, erosion and chemical resistance and similar characteristics desired in a composition having commercial usefulness in the construction industry. This is achieved, according to my invention, through the provision of a cementitious composition comprising a mixture of aluminous cement, gypsum, a drying shrinkage inhibitor and a wet expansion inhibitor.

In particular, the cementitious composition, according to my invention, comprises aluminous cement, gypsum, a drying shrinkage inhibitor, preferably Portland cement, and a salt of lithium in an amount effective to act as a wet expansion inhibitor.

Thus, an object of my invention is the provision of a cementitious composition which, when mixed with water, sets in a relatively short period of time to a hard mass without excessive wet or dry hardened volume changes.

A further object of my invention is the provision of a method for inhibiting hardened volume changes in cementitious compositions containing aluminous cement and gypsum and a drying shrinkage inhibitor.

The wet expansion inhibiting lithium salt may be added in an effective amount ranging between 0.01 to 0.5 percent, by weight, based on the aluminous cement and gypsum, and preferably between 0.1 and 0.3 percent. It is preferred to employ between 60 and 90 percent, by weight, aluminous cement and between 10 and 40 percent, by weight, gypsum. The hardened drying shrinkage inhibitor, Portland cement, is added in an amount ranging between 0.1 and 25 percent, by weight, based on the aluminous cement and gypsum, and preferably between 1 and 20 percent.

In addition to the aforementioned essential constituents of the cementitious composition of my invention, additional components, such as viscosity controllers, surface active agents, retarders, accelerators, gas generating or gas releasing agents, fly ash, plasticizers, pumping aids, water retentivity aids, fillers, and aggregates may be utilized.

A further object of my invention is the provision of a method and composition for inhibiting wet expansion in cementitious systems while permitting such systems to set in a relatively short period of time to form a hard mass of high compressive strength, high abrasion resistance and high erosion and corrosion resistance, without substantial shrinkage during setting and without excessive dry hardened volume changes while possessing a high degree of impermeability to fluids.

The foregoing and other objects, features and advantages of my invention will be further apparent from the following detailed description thereof and the accompanying claims.

DESCRIPTION OF THE PREFERRED EMBODIMENTS

The invention is best illustrated by the following examples which demonstrate, that surprisingly, the addition of lithium salts to cementitious compositions containing aluminous cement, gypsum and Portland cement as a hardened drying shrinkage inhibitor, inhibits the wet expansion of the composition in the hardened state. In the examples, the constituents were blended in the dry powder state and then mixed with tap water to form a loose, workable consistency. Generally the ratio of constituents to sand, or aggregate, was 1:1 to 1:2. The homogeneous mix was then placed into ten-inch bar steel molds meeting the standard specification for "Apparatus for Use in Measurement of Length Change of Hardened Cement Paste, Mortar, and Concrete," ASTM C 490. The molds were heavily lined with a resin based release agent and a thin sheet of polyethylene to facilitate the demolding of delicate hardened specimens. The specimens were demolded as soon after hardening as possible without causing damage to the test hardened specimen, usually one-half to two hours after final set.

Initial length change measurements of the test specimens were made immediately after demolding in order to best determine the true hardened state length change. Two specimens of each mixture were tested; one specimen was used for determining the wet length change and the second for dry length change. Wet test specimens were totally submerged in water for the duration of the test while dry specimens were air cured for the duration of the test. The ten-inch bar test specimens were measured to the nearest ten-thousandth of an inch, using a length change comparator conforming to the requirements of the above mentioned ASTM C 490 specification. The length change measurements were made essentially in accordance with the standard test method for "Length Change of Hardened Cement Mortar and Concrete," ASTM C-157. All length change results were based on a mix of one part cement and one part sand or adjusted to that basis. Abrasion resistance was determined on a coating of the mix troweled on a cement block.

The following examples are representative of the results obtained in carrying out my invention.

EXAMPLE 1

A control specimen was prepared as described above using 80 percent, by weight, aluminous cement (Lumnite) and twenty percent, by weight, gypsum (Densite K-5). After four days aging the percentage length change in the hardened state was measured and found to be 0.321 percent wet expansion and 0.012 percent dry shrinkage. The abrasion resistance, measured on scale of one to ten, with ten being the hardest, was four.

EXAMPLE 2

The composition and procedure of Example 1 was followed except that 0.2 percent, by weight, based on the aluminous cement and gypsum (which hereinafter shall be the bases unless otherwise indicated) wet expansion inhibitor comprising lithium carbonate was added to the composition. The percentage length change in the hardened state after four days was 0.065 percent wet expansion and 0.179 percent dry shrinkage with the abrasion resistance being six.

EXAMPLE 3

The composition and procedure of Example 1 was followed except that a Portland cement, Type III, was added as a drying shrinkage inhibitor in an amount of 19 percent, by weight based on the combined amount of aluminous cement and gypsum. The percentage length change was measured after 2 hours because the wet expansion was such that the specimen cracked. At the end of the 2 hour time period the wet expansion was 1.33 percent. There was no dry shrinkage but rather a dry expansion of 0.084 percent. The abrasion resistance was seven.

EXAMPLE 4

The composition and procedure of Example 2 was followed with the addition thereto to Portland cement, Type III, as a drying shrinkage inhibitor in an amount of 10 percent by weight. After four days, the percentage length change was measured as 0.188 percent wet expansion and 0.100 percent dry shrinkage. The abrasion resistance was ten.

From the foregoing Examples 1 through 4, it can be seen that lithium salts are effective wet expansion inhibitors for aluminous cement-gypsum formulations while compositions containing aluminous cement, gypsum and lithium salts with the further addition of Portland cement as a drying shrinkage inhibitor produce a composition possessing favorable length change properties. In addition to the lithium carbonate, other lithium salts are useful as wet expansion inhibitors. Examples of such lithium salts which have performed satisfactorily include lithium citrate, lithium hydroxide and lithium acetate.

EXAMPLE 5

The composition and procedure of Example 4 was followed except that the Portland cement was added in an amount of 11 percent and a curing agent was added after hardening. After thirty days, the percentage length change in the dry state was measured and found to be zero. The abrasion resistance was ten.

Example 5 demonstrates that by selecting the composition formulation, the net length can be controlled to net zero shrinkage or expansion. It has also been found that the cementitious composition according to this invention can be formulated by varying the inhibitors or cement combinations in such a way as to control the net length change in a particular environment, such as wet, dry, or alternating wet and dry.

EXAMPLE 6

To the composition of Example 5 was added 1 percent, by weight, surface active agent available under the commercial designation Lomar D, and 0.1 percent, by weight, anhydrous citric acid powder and the constituents blended to an intermediate dry mix. This cement admixture was mixed with abrasion resistant aggregate in a ratio of 3:7, respectively. The resultant mixture was then mixed with water to yield a self leveling consistency and then applied to a concrete block. The composition set in 20 minutes and developed a compressive strength of 6,000 psi in 24 hours when tested in accordance with ASTM C 109. The composition showed very high bonding properties and was very hard and abrasion resistant within 24 hours. In addition, the composition showed high freeze/thaw resistance and resistance to corrosive substances. The composition set without any noticeable shrinkage, surface cracks, or dusting without the need for moist curing or a curing agent. In addition, the surface of the coated block was subjected to a 25 psi fine jet of water for a period of a week without noticeable erosion.

EXAMPLE 7

Following the procedure described above with respect to Examples 1 through 4, a further control specimen was made from a composition containing 80 percent, by weight based on aluminous cement and gypsum, Portland cement, Type III, as a drying shrinkage inhibitor. The percentage length change was measured after 2 days and found to be 0.383 percent wet expansion with no dry shrinkage or dry expansion whatsoever.

EXAMPLE 8

To the composition described in Example 7 was added 0.2 percent, by weight, sodium carbonate, a known accelerator, to determine its effectiveness as a wet expansion inhibitor. After two days, the percentage length change was 0.366 percent wet expansion and 0.026 percent dry expansion. Thus, there was expansion in the dry state over and above that experienced by the control specimen of Example 7 while the expansion in the wet state was nearly as great as that of the control and unacceptable.

EXAMPLE 9

To the composition of Example 7 was added 0.2 percent, by weight, aluminum sulphate, a known accelerator, to determine its effectiveness as a wet expansion inhibitor. After two days, the percentage length change measured 0.415 percent wet expansion and 0.017 percent dry expansion indicating that, like the sodium carbonate, aluminum sulfate was not effective to satisfactorily inhibit wet expansion in aluminous cement-gypsum-Portland cement systems.

EXAMPLE 10

To the composition of Example 7 was added 0.2 percent, by weight, lithium citrate to determine its effectiveness as a wet expansion inhibitor. After two days, the percentage length change was only 0.186 percent wet expansion, less than half that of the control specimen, and 0.006 percent dry shrinkage. This demonstrates that lithium salts are unique to this cementitious system as wet expansion inhibitors. The lithium salts do not adversely affect the fluid impermeability properties of the cementitious system to any significant degree and thus the system remains one possessing excellent waterproofing properties.

In the cementitious composition according to my invention containing aluminous cement, gypsum, and wet and dry volume change inhibitors, it is preferred to employ between 60 and 90 percent aluminous cement and between 10 and 40 percent gypsum. Generally, the hardened drying shrinkage inhibitor, Portland cement, can be added to the total weight of the aluminous cement and gypsum in an amount ranging between 0.1 and 25 percent, and most advantageously and preferably between 1 and 20 percent. Generally, the lithium salts should be added in an amount ranging between 0.01 and 0.5 percent, by weight based on the aluminous cement and gypsum, and advantageously and preferably between 0.1 and 0.3 percent.

In addition to the aforementioned essential constituents of the cementitious compositions of the invention, other additives for adjusting the properties may generally be incorporated without loss of the wet expansion inhibition benefits obtained if otherwise compatible with the essential constituents. Such other additives include viscosity controllers, expansive agents, surface active agents, retarders, accelerators, gas generating or gas releasing agents, fly ash, fillers, pumping aids, water retentivity aids, and aggregates to impart selective improvement of specific properties. Other additives normally employed in the industry for cementitious systems may also be utilized provided that their use is not incompatible with the results desired or described herein.

The lithium salts may be blended with the other constituents in the dry state or added at the time of adding water or to the water added or after the addition of water. It does not necessarily matter when the respective materials are added to the mixture as long as they are all incorporated therein so as to produce a homogeneous mixture in the slurry. Those skilled in the art will appreciate that recognized methods of manufacturing cementitious compositions may be utilized for the composition of my invention including methods of mixing prior to carrying out the processing steps such as firing, as well as intergrinding or blending of final consitutuents provided that the steps are not deleterious to any of the components.

I claim:

1. A cementitious composition which, when mixed with water, is capable of setting into a hard mass with inhibited wet expansion in the hardened state comprising aluminous cement, gypsum, a drying shrinkage inhibitor and a salt of lithium in an amount effective to act as a wet expansion inhibitor.

2. A cementitious composition as claimed in claim 1 wherein the salt of lithium is present in an amount ranging from 0.01 to 0.5 percent, by weight, based on the amount of aluminous cement and gypsum.

3. A cementitious composition as claimed in claim 2 wherein the aluminous cement is present in an amount ranging from 60 to 90 percent, by weight, based on the total weight of aluminous cement and gypsum.

4. A cementitious composition as claimed in claim 2 wherein the gypsum is present in an amount ranging from 10 to 40 percent, by weight, based on the total weight of aluminous cement and gypsum.

5. A cementitious composition as claimed in claim 2 wherein the drying shrinkage inhibitor is present in an amount ranging from 0.1 to 25 percent, by weight, based on the total weight of aluminous cement and gypsum.

6. A cementitious composition comprising 60 to 90 percent, by weight, aluminous cement, 10 to 40 percent, by weight, gypsum, 0.1 to 25 percent, by weight, based on the amount of aluminous cement and gypsum, Portland cement and 0.01 to 0.5 percent, by weight, based on the amount of aluminous cement and gypsum, of a salt of lithium as a wet expansion inhibitor.

7. A cementitious composition as claimed in claim 6 wherein the aluminous cement is one selected from the group consisting of high alumina cement, calcium aluminate cement and cement whose main cementitious constituent comprises monocalcium aluminate, the gypsum is one selected from the group consisting of calcium sulfate, calcium sulfate anhydrate, calcium sulfate hemihydrate, calcium sulfate dihydrate, plaster of Paris, calcined gypsum and pressure calcined gypsum and the salt of lithium is one selected from the group consisting of lithium carbonate, lithium citrate, lithium hydroxide and lithium acetate.

8. A cementitious composition as claimed in claim 6 or 7 wherein the salt of lithium is present in an amount ranging from 0.1 to 0.3 percent, by weight, based on the total amount of aluminous cement and gypsum.

9. A cementitious composition as claimed in claim 8 wherein the Portland cement is a type III Portland cement present in an amount ranging from 1 to 20 percent, by weight, based on the total amount of aluminous cement and gypsum.

10. In a cementitious composition which when mixed with water is capable of setting into a hard mass in a short period of time without substantial shrinkage during setting and possessing a high degree of impermeability to fluids, comprising aluminous cement, gypsum and Portland cement the improvement therein enabling inhibition of expansion of the hardened system in the wet state, comprising the addition thereto of a salt of lithium in an amount effective to inhibit hardened state wet expansion.

11. An improved cementitious composition as claimed in claim 10 wherein the salt of lithium is one selected from the group consisting of lithium carbonate, lithium citrate, lithium hydroxide and lithium acetate.

12. An improved cementitious composition as claimed in claim 10 wherein the aluminous cement is a high alumina cement, the gypsum is a pressure calcined gypsum and the Portland cement is a Type III cement.

13. An improved cementitious composition as claimed in claim 12 wherein the high alumina cement is present in an amount of 80 parts by weight, the gypsum is present in an amount of 20 parts by weight, the Type III Portland cement is present in an amount of 10 parts by weight, and the lithium salt is lithium carbonate present in an amount of 0.2 parts by weight.

14. An improved composition as claimed in claim 13 further comprising a curing agent to be added after hardening.

15. An improved composition as claimed in claim 14 further comprising a surface active agent and a retarder.

16. A method of inhibiting wet expansion in the hardened state of a cementitious system comprising aluminous cement, gypsum and a drying shrinkage inhibitor comprising admixing therewith, prior to hardening, a salt of lithium.

17. A method as claimed in claim 16 wherein the drying shrinkage inhibitor comprises Portland cement.

18. A method as claimed in claim 16 or 17 wherein the amount of the salt of lithium admixed comprises from 0.01 to 0.5 percent, by weight, based on the aluminous cement and gypsum.

19. A method as claimed in claim 18 wherein the salt of lithium comprises one selected from the group consisting of lithium carbonate, lithium citrate, lithium hydroxide and lithium acetate.

20. A hardened cementitious composition having inhibited wet expansion comprising the reaction products, when mixed with water, of aluminous cement, gypsum, Portland cement and a salt of lithium.

* * * * *

UNITED STATES PATENT AND TRADEMARK OFFICE
CERTIFICATE OF CORRECTION

PATENT NO. : U.S. 4,357,166
DATED : November 2, 1982
INVENTOR(S) : Warner K. Babcock It is certified that error appears in the above—identified patent and that said Letters Patent is hereby corrected as shown below:

Column 2, line 1, "cementitous" should be --cementitious--.

Column 4, line 46 "1:1 to 1:2" should be --1:1 or 1:2--.

Signed and Sealed this

First Day of February 1983

[SEAL]

Attest:

GERALD J. MOSSINGHOFF

Attesting Officer    Commissioner of Patents and Trademarks